(12) United States Patent
Goodman

(10) Patent No.: US 7,107,127 B2
(45) Date of Patent: Sep. 12, 2006

(54) COMPUTATIONALLY EFFICIENT MEANS FOR OPTIMAL CONTROL WITH CONTROL CONSTRAINTS

(75) Inventor: Robert Karl Goodman, West Hartford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 582 days.

(21) Appl. No.: 10/085,575

(22) Filed: Feb. 26, 2002

(65) Prior Publication Data

US 2002/0120366 A1 Aug. 29, 2002

Related U.S. Application Data

(60) Provisional application No. 60/271,792, filed on Feb. 27, 2001.

(51) Int. Cl.
*G05D 23/00* (2006.01)

(52) U.S. Cl. .................. 700/280; 700/275; 702/56; 702/194; 381/71.2

(58) Field of Classification Search .......... 700/19, 700/72, 275, 280; 702/56, 191, 193, 194; 381/71.1, 71.2, 71.4, 71.7, 71.8, 71.12, 71.14; 244/1 N See application file for complete search history.

(56) References Cited

U.S. PATENT DOCUMENTS

| | | | | |
|---|---|---|---|---|
| 4,715,559 A | * | 12/1987 | Fuller | .................. 244/1 N |
| 5,267,320 A | * | 11/1993 | Fukumizu | .................. 381/71.12 |
| 5,347,586 A | | 9/1994 | Hill et al. | |
| 5,365,594 A | | 11/1994 | Ross et al. | |
| 5,386,472 A | | 1/1995 | Pfaff et al. | |
| 5,526,292 A | | 6/1996 | Hodgson et al. | |
| 5,558,298 A | | 9/1996 | Pla et al. | |
| 5,627,896 A | * | 5/1997 | Southward et al. | ...... 381/71.11 |
| 5,629,986 A | * | 5/1997 | Shoureshi | .................. 381/71.12 |
| 5,838,802 A | * | 11/1998 | Swinbanks | .................. 381/71.2 |
| 5,845,236 A | * | 12/1998 | Jolly et al. | .................. 702/195 |
| 5,940,519 A | | 8/1999 | Kuo | |
| 6,094,601 A | | 7/2000 | Popovich | |
| 6,138,947 A | | 10/2000 | Welsh et al. | |
| 6,229,898 B1 | * | 5/2001 | Goodman | .................. 381/71.4 |
| 6,772,074 B1 | * | 8/2004 | Millott et al. | .................. 702/56 |
| 6,856,920 B1 | * | 2/2005 | Millott et al. | .................. 702/56 |
| 7,003,380 B1 | * | 2/2006 | MacMartin et al. | ........ 700/280 |

FOREIGN PATENT DOCUMENTS

EP 0773531 A2 5/1997

OTHER PUBLICATIONS

Douglas E. Melton, R.A. Greiner, Adaptive Feedforward Multiple-input, Multiple-Output Active Noise Control, 1992, pp. II-229-232.
Search Report PCT/US02/05922.
Search Report PCT/US02/05845.

(Continued)

*Primary Examiner*—Leo Picard
*Assistant Examiner*—Alexander Kosowski
(74) *Attorney, Agent, or Firm*—Carlson, Gaskey & Olds

(57) ABSTRACT

A method and system that reduces undesired vibration in a vehicle measures ambient vibration and generates a first command signal based upon the measured vibration. If a first component of the first command signal exceeds a maximum allowable, the first component of the first command signal must be constrained. A residual vibration resulting from the constraint of the first component is then calculated. A second command signal to compensate for the residual vibration is then calculated. Force generators are then activated based upon the constrained first component and the second command signal in order to reduce the vibration.

18 Claims, 2 Drawing Sheets

OTHER PUBLICATIONS

Millott, Thomas A., Welsh, William A., Yoerkie, Jr., Charles A., MacMartin, Douglas G., Davis, Mark W., Flight Test of Active Gear-Mesh Noise Control on the S-76 Aircraft, United Technologies Research Center, East Hartford, CT and . . . Sikorsky Aircraft Corporation, Stratford, CT. Presented at the American Helicopter Society 54th Ann ual Forum, Washington, D.C., May 20-22, 1998, American Helicopter Society, Inc.

Davis, Mark W., Refinement and Evaluation of Helicopter Real-Time Self-Adaptive Active Vibration Controller Algorithms, NASA Contractor Report 3821, Aug. 1984.

U.S. Patent Application: "Computationally Efficient Means For Optimal Control With Control Constraints", U.S. Appl. No. 10/083,774, filed Feb. 27, 2002.

U.S. Patent Application: "System For Computationally Efficient Active Control Of Tonal Sound or Vibration", Serial No. 10/083,773, filed Feb. 27, 2002.

MacMartin, Douglas G., Davis, Mark W., Yoerkie, Jr., Charles A. Welsh, William A., "Helicopter Gear-Mesh ANC Concept Demonstration", Active '97, Budapest, Hungry, Aug. 1997.

* cited by examiner

COMPUTATIONALLY EFFICIENT MEANS FOR OPTIMAL CONTROL WITH CONTROL CONSTRAINTS

This application claims priority to U.S. Provisional Application Ser. No. 60/271,792, Filed Feb. 27, 2001.

BACKGROUND OF THE INVENTION

1. Field of the Invention

This invention relates to optimal control of a system. More particularly, this invention relates to active vibration and active sound control systems for the interior of helicopters.

2. Background Art

Conventional active control systems consist of a number of sensors that measure the ambient variables of interest (e.g. sound or vibration), a number of actuators capable of generating an effect on these variables (e.g. by producing sound or vibration), and a computer which processes the information received from the sensors and sends commands to the actuators so as to reduce the amplitude of the sensor signals. The control algorithm is the scheme by which the decisions are made as to what commands to the actuators are appropriate.

A problem may arise in such a control scheme when the control decision yields a command that exceeds the physical capabilities of the system, for example, if the command to an actuator exceeds the actuator's physical limits.

SUMMARY OF THE INVENTION

The present invention constrains commands in a computationally efficient manner while eliminating performance penalties. In the present invention, the control algorithm generates a first command signal. If that first command signal includes a $k_{th}$ component (for the $k_{th}$ actuator) that exceeds a maximum allowable value, that component is scaled to or below the maximum allowable value. An anticipated residual vibration is then calculated based upon the change in the $k_{th}$ component. A second command signal is then generated to try to compensate for the residual vibration (ignoring the $k_{th}$ actuator, which is already at or near the maximum allowable signal). The first command signal (with the scaled $k_{th}$ component) and the second command signal (with a zero component for the $k_{th}$ actuator) are summed to yield a third command signal, the components of which may again be compared to the maximum allowable values, and the method performed iteratively before actually sending the command signal to the actuators.

DETAILED DESCRIPTION

Active vibration and sound control systems consist of a number of sensors which measure ambient vibration (or sound), actuators capable of generating vibration (or sound) at the sensor locations, and a computer which process information received from the sensors and sends commands to the actuators which generate a vibration (or sound) field to cancel ambient vibration (generated, for example by a disturbing force at the helicopter rotor). The controller algorithm is the scheme by which the decisions are made as to what the appropriate commands to the actuators are.

Figure 1:
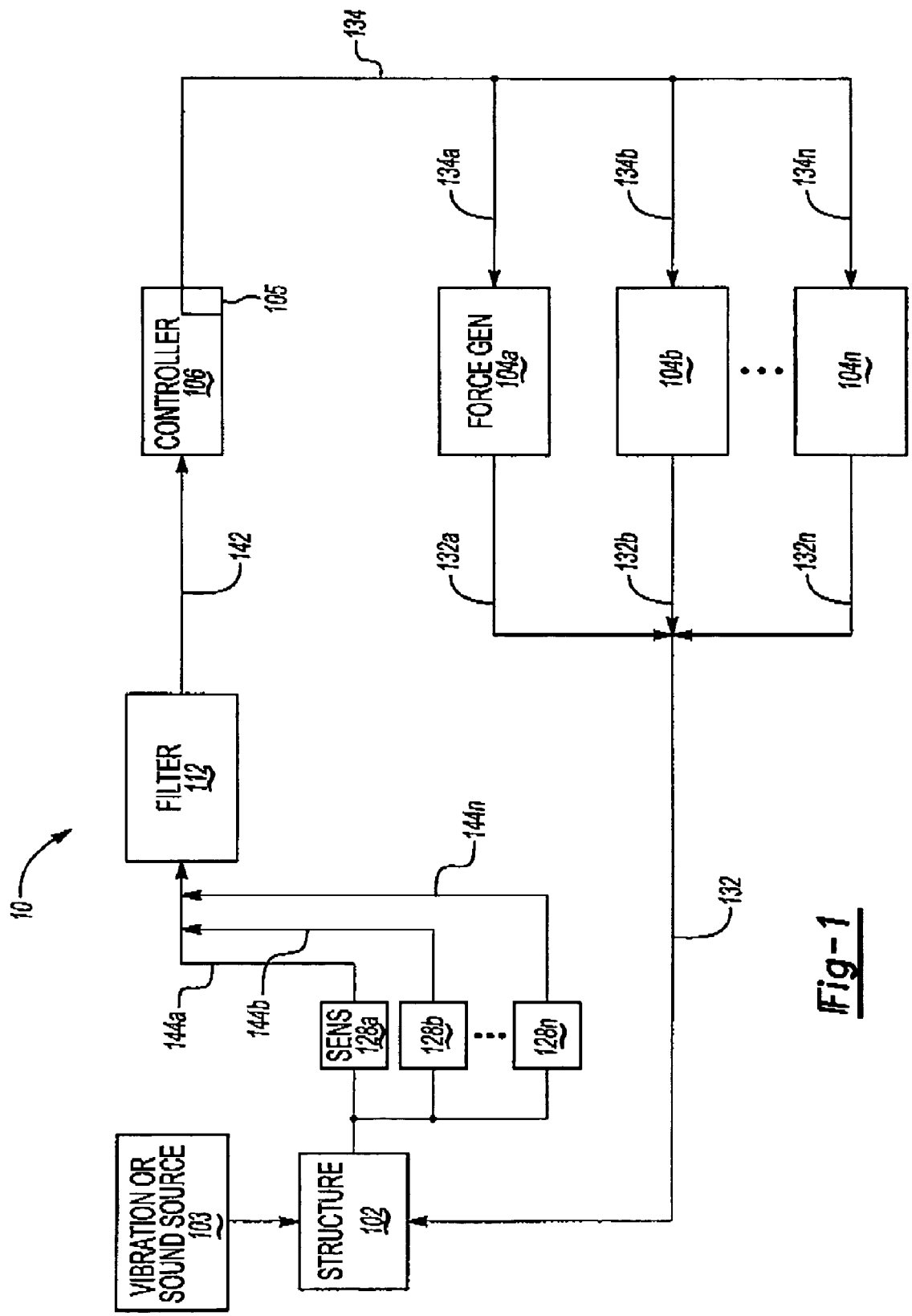
FIG. 1 shows a block diagram of the noise control system of the present invention.

FIG. 1 shows a block diagram 10 of an active control system. The system comprises a structure 102, the response of which is to be controlled, sensors 128, filter 112, control unit 106 and force generators (also referred to as actuators) 104. A vibration or sound source 103 produces undesired response of the structure 102. In a helicopter, for example, the undesired disturbances are typically due to vibratory aerodynamic loading of rotor blades, gear clash, or other source of vibrational noise. A plurality of sensors 128(a) ... (n) (where n is any suitable number) measure the ambient variables of interest (e.g. sound or vibration). The sensors (generally 128) are typically microphones or accelerometers. Sensors 128 generate an electrical signal that corresponds to sensed sound or vibration. The electrical signals are transmitted to filter 112 via an associated interconnector 144(a) ... (n) (generally 144). Interconnector 144 is typically wires or wireless transmission means, as known to those skilled in the art.

Filter 112 receives the sensed vibration signals from sensors 128 and performs filtering on the signals, eliminating information that is not relevant to vibration or sound control. The output from the filter 112 is transmitted to control unit 106 via interconnector 142. The control circuit 106 generates control signals that control force generators 104(a) ... (n).

A plurality of force generators 104(a) ... (n) (where n is any suitable number) are used to generate a force capable of affecting the sensed variables (e.g. by producing sound or vibration). Force generators 104(a) ... (n) (generally 104) are typically speakers, shakers, or virtually any suitable actuators. Force generators 104 receive commands from the control unit 106 via interconnector 134 and output a force, as shown by lines 132(a) ... (n) to compensate for the sensed vibration or sound produced by vibration or sound source 103.

The control unit 106 is typically a processing module with computing capabilities. Control unit 106 stores control algorithms control memory 105, or other suitable memory location. Memory module 105 is, for example, RAM, ROM, DVD, CD, a hard drive, or other electronic, optical, magnetic, or any other computer readable medium onto which is stored the control algorithms described herein. The control algorithms are the scheme by which the decisions are made as to what commands to the actuators 104 are appropriate. Control circuit 106 is, for example, a microprocessor.

Measurements of ambient vibration level at a given moment may be assembled in a vector of dimension $N_{sensors} \times 1$, designated z. The commands to the actuators may likewise be assembled in a vector of dimension $N_{actuators} \times 1$, designate u. The relationship between a change in actuator commands and the resulting change in sensor measurements may be expressed as the matrix equation $\Delta z = T \Delta u$, where T is a matrix of dimension $N_{sensors} \times N_{actuators}$. The values of the elements of T are determined by the physical characteristics of the structure, for example: $T_{11}$ is the response at sensor #1 due to unit command at actuator #1, $T_{12}$ is the response at sensor #1 due to a unit command at actuator #2, etc. Many algorithms may be used for making control decisions based on this model. One such algorithm seeks to minimize the scalar performance index given by:

$$J_{cost}=z^T W_z z + u^T W_u u + \Delta u^T W_{\Delta u} \Delta u$$

where
- $W_z$ is a diagonal weighting matrix of sensor measurements;
- $W_u$ is a diagonal weighting matrix which constrains control inputs;
- $W_{\Delta u}$ is a diagonal weighting matrix which constrains rate of change of control inputs;
- and T designates the transpose of a vector or matrix.

With this objective, the control decision for the $i^{th}$ step takes the form $$\Delta u_i = D[W_u u_{i-1} + T^T W_z (z_{i-1})]$$

where $$D = -(T^T W_z T + W_u + W_{\Delta u})^{-1} \qquad \text{Equation (1)}$$

and $^{-1}$ indicates a matrix inversion.

A problem may arise in such a control scheme when the control decision yields a command that exceeds the physical capabilities of the system, for example, if the command to a force generating actuator exceeds the actuator's physical limits. The strategy for imposing constraints on the commands can dramatically affect control system performance.

One such strategy is to impose command constraints by scaling the commands to actuators by a constant which reduced the maximum command component to the maximum allowable. In other words, if a component of $u_i$ is greater than maximum allowable then setting $u_i = K u_i$ where K is selected so that the largest component of $u_i$ is equal to the maximum allowable. While this approach was computationally efficient, it often results in a precipitous drop in system performance when constraints are imposed.

Another way in which command constraints may be imposed is by increasing the value of $W_u$, which increases the cost of commands in the performance index, and consequently drives down the command amplitudes. The problem with this approach is that when $W_u$ is selected to keep commands within constraints during demanding operating conditions performance is degraded during less demanding operating conditions by unnecessarily suppressing command amplitude.

Compared to the first method, the performance of the vibration control system is much better for conditions requiring high actuator output, but much worse for conditions requiring lower actuator output, because the increased value of $W_u$ unnecessarily constraints the actuator commands. An approach to overcoming this problem is to allow $W_u$ to vary based on command levels, though this introduces additional complexity associated with stability of the control system used to schedule variation of $W_u$.

The present invention provides a means for constraining commands in a computationally efficient manner while eliminating performance penalties.

The controller algorithm is modified to do the following:

The change in command is calculated as before in accordance with:

$$\Delta u_i = D(W_u u_{i-1} + T^T W_z (z_{i-1})).$$

Before sending the command to the actuators, the magnitudes of the components of the resulting command $u_i = \Delta u_i + u_{i-1}$ are calculated and the component with maximum amplitude is identified. If that component for example, the kth component $u_{i,k}$ is greater than the maximum allowable, then that component is scaled by a constant to reduce its amplitude to the maximum allowable $(u_{i,k})_{new} = C u_{i,k}$, where $C = |(u_i)_k| / U_{max}$, and the change in the kth component in the command is calculated $\Delta u_{i,k} = (u_{i,k})_{new} - u_{i-1,k}$. The response to this component of the command is then calculated by:

$$(z_{i-1})_{new} = (z_{i-1}) + T \Delta u_{i,k}.$$

This quantity, $(z_{i-1})_{new}$, is the residual vibration which remains after the constrained control component alone is applied to the system. Now a new controller weighting matrix $W_{u,new}$ is created which is identical to $W_u$ except that the element associated with weighting the constrained control component, $W_{u,new,k,k} = W_{u,k,k} + A$ where A is a very large number. By modifying $W_{u,new}$ in this way, the participation of the kth control component is suppressed in attacking this residual vibration. A new command change is calculated with $$D_{new} = -(T^T W_z T + W_{u,new} + W_{\Delta u})^{-1} \qquad \text{Equation (2)}$$

and $$\Delta u_{i,new} = D_{new}(W_{u,new} u_{i-1} + T^T W_z (z_{i-1})_{new}).$$

The kth component of $\Delta u_{i,new}$ will be 0 because of increased value of $W_{u,new,k,k}$. Finally, the command to be sent to the actuators is constructed:

$$\Delta u_{i,to\ actuators} = \Delta u_{i,new} + \Delta u_{i,k}.$$

The procedure can be applied iteratively in case another component of $\Delta u_{i,to\ actuators}$ exceeds maximum allowable command amplitude. Compared to the previous methods, performance is very good at both high and low speed.

The procedure can be rendered computationally efficient if the matrix inversion in Equation (2) can be eliminated. Noting that matrix which is inverted in Equation (1) differs only in one element from the matrix inverted in Equation (2) (the k,k element), and the elements of $D_{new}$ can be determined without matrix inversion using the relationship:

$$D_{new\ 1,m} = D_{1,m} - A\ D_{1,k} D_{k,m} / (1 + A\ D_{k,k})$$

where $W_{u,new\ k,k} = W_{u\ k,k} + A$.

Figure 2:
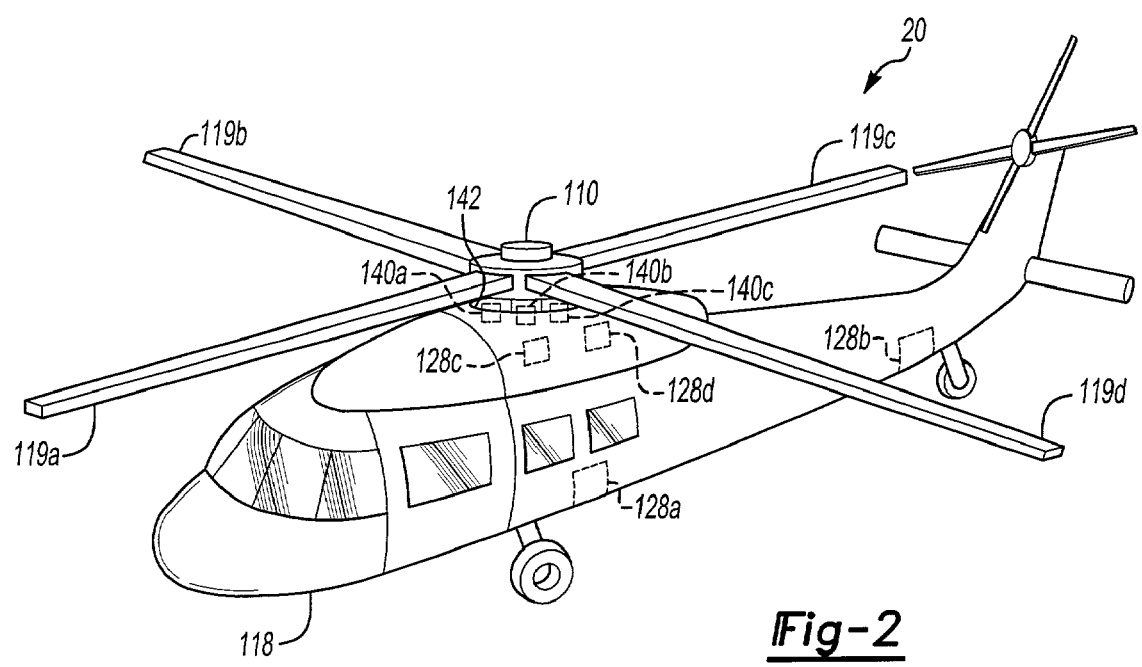
FIG. 2 shows a vehicle in which the present invention may be used.

FIG. 2 shows a perspective view 20 of a vehicle 118 in which the present invention can be used. Vehicle 118, which is typically a helicopter, has rotor blades 119 (a) . . . (d). Gearbox housing 110 is mounted at an upper portion of vehicle 118. Gearbox mounted feet 140 (a) . . . (c) (generally 140) provide a mechanism for affixing gearbox housing 110 to vehicle airframe 142. Sensors 128(a) through (d) (generally 128) are used to sense vibration or sound produced by the vehicle, which can be from the rotorblades 119 or the gearbox housing 110. Although only four sensors are shown, there are typically any suitable number of sensors necessary to provide sufficient feedback to the controller (not shown). The sensors 128 may be mounted in the vehicle cabin, on the gearbox mounting feet 140, or to the airframe 142, or to another location on the vehicle 118 that enables vehicle vibrations or acoustic sound to be sensed. Sensors 128 are typically microphones or accelerometers. These sensors generate electrical signals (voltages) that are proportional to the local sound or vibration.

The present invention has been described in detail by way of examples and illustrations for purposes of clarity and understanding, and not to in any way limit the scope of what is claimed. Those skilled in the art will understand that certain changes and modifications may be made without departing from the scope of the invention. Alphanumeric identifiers for steps in the method claims are for ease of reference by dependent claims, and do not indicate a required sequence, unless otherwise indicated.

What is claimed is:

1. A method for actively controlling vibration including the steps of:
   a. measuring ambient vibration;
   b. generating a first command signal based upon said vibration measured in said step a;
   c. constraining a first component of the first command signal;
   d. calculating a residual vibration resulting from the constraint of the first component, wherein the residual vibration is calculated based upon the constraint; and
   e. generating a second command signal based upon said residual vibration calculated in said step d.

2. The method of claim 1 further including the steps of:
   f. activating a plurality of force generators based upon said constrained first component and said second command signal.

3. The method of claim 2 wherein said step c. further includes the step of comparing said first component of the first command signal to a maximum allowable command signal.

4. The method of claim 3 wherein said step c. further includes the step of reducing the first component to the maximum allowable command signal.

5. The method of claim 1 further including the steps of:
   generating an ambient vibration signal representative of the ambient vibration measured in said step a. and storing said ambient vibration signal on a computer; and
   storing a matrix T on the computer, the matrix T representing a relationship between a change in command signals and a resulting change in measured ambient vibration, the generation of the first command signal in said step b. based upon the matrix T, the calculation of the residual vibration in said step d. based upon the matrix T.

6. An active control system comprising:
   a plurality of sensors for measuring ambient vibration;
   a control unit generating a first command signal based upon said vibration measured by said plurality of sensors and based upon a matrix T, wherein T represents a relationship between a change in command signals and a resulting change in sensor measurements, constraining a first component of the first command signal, performing a calculation based upon T to determine a residual vibration resulting from the constraint of the first component, the control unit generating a second command signal based upon said calculated residual vibration; and
   a plurality of force generators activated based upon said first command signal, said second command signal and said constrained first component.

7. The active control system of claim 6 wherein the control unit compares said first component of said first command signal to a maximum allowable command signal.

8. The active control system of claim 7 wherein the control unit reduces the first component to not exceed the maximum allowable command signal.

9. A computer readable medium storing a computer program, which when executed by a computer performs the steps of:
   a. generating a first command signal based upon measured vibration;
   b. constraining a first component of the first command signal;
   c. calculating a residual vibration resulting from the constraint of the first component, wherein the constraint of the first component of the first command signal is an input to the calculation; and
   d. generating a second command signal based upon said residual vibration calculated in said step c.

10. The computer readable medium of claim 9 which when executed by a computer further performs the steps of:
    e. activating a plurality of force generators based upon said first command signal, said constrained first component and said second command signal.

11. The computer readable medium of claim 9 which when executed by a computer said step b. further includes the step of comparing said first component of the first command signal to a maximum allowable command signal.

12. The computer readable medium of claim 11 wherein said step c. further includes the step of reducing the first component to the maximum allowable command signal.

13. A method for actively controlling vibration including the steps of:
    a) sensing ambient vibration;
    b) generating a first sensed signal as a function of the sensed ambient vibration;
    c) generating a first control command signal as a function of the first sensed signal;
    d) constraining a selected component of the first control command signal;
    e) calculating a residual that is expected to result from the constraint of the selected component, wherein the calculation is based upon the constraint of the selected component;
    f) generating a second control command signal in response to the residual calculated in step e); and
    g) generating a compensating force as a function of the constrained selected component and the second control command signal.

14. The method according to claim 13, wherein said step d) further includes the steps of:
    comparing components, including the selected component, to a maximum threshold; and
    scaling the selected component by a constant based upon the selected component exceeding the maximum threshold.

15. The method according to claim 14 further including the steps of:
    performing said step of constraining the selected component in said step d) based upon the selected component and the maximum threshold;
    calculating a change in the selected component in the control command signals; and
    calculating the residual as a function of the change in the selected component in the control command signals.

16. The method according to claim 13 further including the steps of:
    generating a controller weighting matrix;
    generating a constrained control component as a function of a component of the controller weighting matrix corresponding to the selected component added to a constant that greatly exceeds the magnitude of the corresponding controller weighting matrix component.

17. The method according to claim 16, further including the steps of:
    calculating a new command change as a function of the constrained control component.

18. The method of claim 13 wherein the constraint of the selected component is an input to the calculation of the residual in said step e).

* * * * *